(12) United States Patent
Hong et al.

(10) Patent No.: US 6,641,790 B2
(45) Date of Patent: Nov. 4, 2003

(54) METHOD FOR REMOVING NITROGEN OXIDES USING NATURAL MANGANESE ORES

(75) Inventors: Sung-Ho Hong, Seoul (KR); Hyun-Young Chang, Kyounggido (KR); Seok-Joo Hong, Seoul (KR); Dong-Won Kim, Kyounggido (KR); Sung-Chang Hong, Seoul (KR); Tae-Sung Park, Seoul (KR); Dong-Sup Doh, Seoul (KR); Soon-Kwan Jung, Seoul (KR)

(73) Assignee: Korea Power Engineering Company, Seoul (KR)

( * ) Notice: Subject to any disclaimer, the term of this patent is extended or adjusted under 35 U.S.C. 154(b) by 0 days.

(21) Appl. No.: 09/947,894

(22) Filed: Sep. 6, 2001

(65) Prior Publication Data

US 2002/0155049 A1 Oct. 24, 2002

Related U.S. Application Data

(63) Continuation-in-part of application No. 09/423,993, filed as application No. PCT/KR98/00123 on May 16, 1998, now abandoned.

(30) Foreign Application Priority Data

May 17, 1997 (KR) ........................ 1997-19125

(51) Int. Cl.[7] .................................................. C01B 21/00
(52) U.S. Cl. ...................................... 423/239.1; 423/351
(58) Field of Search ............................ 423/239.1, 351

(56) References Cited

U.S. PATENT DOCUMENTS

| | | | | |
|---|---|---|---|---|
| 3,881,696 A | * | 5/1975 | Lepeytre et al. | 252/455 |
| 4,001,372 A | * | 1/1977 | Okabe et al. | 423/235 |
| 5,366,710 A | * | 11/1994 | Chou et al. | 423/235 |
| 5,589,147 A | * | 12/1996 | Farnos et al. | 423/239.2 |

* cited by examiner

Primary Examiner—Stanley S. Silverman
Assistant Examiner—Jonas N. Strickland
(74) Attorney, Agent, or Firm—Abelman, Frayne & Schwab

(57) ABSTRACT

There is disclosed a method for removing nitrogen oxides of exhaust gas using natural manganese ores. In the method, ammonia is used as a reductant to selectively reduce the nitrogen oxides in the presence of a catalyst prepared from the natural manganese ores. The catalyst allows nitrogen oxides to be completely removed from exhaust gas at a relatively low temperature of 130–250° C. without discharging unreacted ammonia through oxidation reaction. The catalyst is superior in economic terms in addition to preventing the deleterious effects which occur when discharging ammonia.

6 Claims, 6 Drawing Sheets

METHOD FOR REMOVING NITROGEN OXIDES USING NATURAL MANGANESE ORES

CROSS-REFERENCE TO RELATED APPLICATION

This application is a continuation-in-part of U.S. patent application Ser. No. 09/423,993, now abandoned filed Nov. 16, 1999, which is based on International Application PCT/KR98/00123 filed May 16, 1998. Each of the above-identified applications is incorporated herein by reference for all purposes.

FIELD OF THE INVENTION

The present invention relates, in general, to a method for removing nitrogen oxides (hereinafter referred to as "NOx") using natural manganese ores and, more particularly, to a method for removing nitrogen oxides by a selective reduction catalytic technique using ammonia as a reductant and natural manganese ores as a catalyst, which shows excellent catalytic activity in reducing Nox contained in exhaust gas at low temperature, without further subjecting the ores to difficult and costly processing.

BACKGROUND OF THE INVENTION

Many techniques have been suggested to remove the NOx contained in the exhaust gas from a source, such as a burner, a boiler, etc. Of them, selective catalytic reduction (SCR) techniques are now evaluated to be the most preferable in economic and technical aspects and extensive studies are being made on the topic of technique. In such an SRC technique, NOx, such as nitrogen monoxide (NO) and nitrogen dioxide ($NO_2$), is reduced to nitrogen and water in the presence of a catalyst with ammonia serving as a reducing agent, as seen in the following reaction formulas I to IV:

$6NO+4NH_3 \rightarrow 5N_2+6H_2O$ (I)

$4NO+4NH_3+O_2 \rightarrow 4N_2+6H_2O$ (II)

$6NO_2+8NH_3 \rightarrow 7N_2+12H_2O$ (III)

$2NO_2+4NH_3+O_2 \rightarrow 3N_2+6H_2O$ (IV)

Whether the SCR techniques are successfully performed or not is dependent on the catalyst.

The catalysts used in the SCR technique have a common feature of being higher in the conversion rate of NOx as the reaction temperature increases. At high temperatures, however, ammonia is apt to be oxidized by reaction with the oxygen contained in the exhaust gas, to lose its function as a reductant, as shown in the following reaction formulas V and VI:

$4NH_3+5O_2 \rightarrow 4NO+6H_2O$ (V)

$4NH_3+3O_2 \rightarrow 2N_2+6H_2O$ (VI)

Thus, the temperatures at which the conversion rate of the Nox reaches the maximum are different from catalyst to catalyst. In the current SCR technique, the catalyst in which $V_2O_5$ is deposited on $TiO_2$ support is commercially used. Furthermore, in order to increase the activity of the catalyst and prevent poisoning by sulfur dioxide, W, Mo and the like are added. Such catalysts show an excellent NOx-removal performance, however have a problem that the optimum operational temperature is high, i.e., around 350° C. A large amount of dust, pollutants and the like are included in exhaust gas at such temperature that the possibility of deactivation and poisoning of the catalyst increases. Accordingly, a dust removing apparatus is required. In particular, when the catalyst is installed in the back of a desulfurizing apparatus, additional heat for activation of the catalyst is needed. Under these circumstances, there has been a need to develop a catalyst which shows an excellent NOx-removing efficiency at low temperature ranges below 250° C. Further, there is a need to develop a process for selectively reducing the catalyst at a low temperature in various field including the back of the heat recovery means of generator, co-generation system, shaft furnace, waste incineration and the like.

In general, among the catalysts suitable for selective catalytic reduction reactions at low temperature, manganese-based metal oxide catalysts are known to have a highest NOx-removing efficiency. The method of using natural manganese ores containing manganese oxides in a large amount has also been suggested.

In this regard, Japanese Patent Laid-open No. Hei 7-88334 discloses a process for removing nitrogen oxides at 90–150° C. by using manganese mineral ores as a catalyst, but the main component of the manganese ores used in this process is $\alpha$-$MnO_2$, which shows Nox-removal efficiency of below 70%, and thus cannot obtain a NOx-removal efficiency of more than 90%

U.S. Pat. No. 4,883,647 discloses a process for removing at least one of the pollutants from an exhaust gas by using manganese nodules. The above manganese nodules include mainly Fe, Mn, Si, Ca and P, the constituents of which are similar to natural manganese ores. However, the main component has a Mn content of 15–30 wt. % and is not present in oxide, but in crystalline phase. It contains a considerable amount of Pt, Ni, Co, Cu, Ti, Pb and the like, which are greatly different from natural manganese ores. Further, the above manganese nodule and the natural manganese ores differ greatly in view of natural morphology, production area, manganese content and physical property. The chemical composition and physical properties of manganese nodules are given as shown in Table 1, below.

TABLE 1

| Chemical Comp. (wt %) | Mn | 11–39 |
|---|---|---|
| | Si | 1–10 |
| | P | 0.5–6 |
| | Fe | 6–23 |
| | Ca | 0.5–13 |
| Density (kg/m³) | | 1640 |
| Specific Surface Area (m²/g) | | 140 |

The above patent discloses that nitrogen oxides can be removed by using manganese nodules as a catalyst and supplying ammonia as a reductant. However, according to the above patent, a NOx-removal efficiency of the catalyst ranges in 30–50% at temperatures of 250–350° C.; in other words, the treatment temperature is high and the efficiency is low.

In the meantime, U.S. Pat. No. 3,975,498 discloses a process for absorbing and removing nitrogen oxides through a column in which an electrolytic manganese dioxide is packed and a process for regenerating the above column.

Further, U.S. Pat. No. 5,589,147 discloses a process for removing nitrogen oxides from exhaust gas in which a selective catalytic reduction technique using ammonia as a reducing agent is carried out in the presence of the catalyst containing metallic oxides such as Cu, Zn, V, Cr, Mn, Co, Fe, Ni, Pd, Pt, Mo, W, Ce and the like on a zeolite-based support such as ZSM-5, ZSM-11 and the like. Among the metallic oxides used in the above patent, manganese oxides include MnO, $Mn_3O_4$, $MnO_3$, $MnO_2$, $Mn_2O_7$ and the like. It is disclosed that they can be used in a single or a mixture form. However, the temperature of removing nitrogen oxides ranges from 200 to 1000° C. As shown in Examples 3 and 5, the conversion rate is low at 250° C., the conversion rate increases as the temperature increases, and it exhibits the conversion rate of more than 70% at 550° C. In this light, the above catalyst is difficult to be regarded as a NOx-removal catalyst employable at a low temperature. Accordingly, there is a need to develop a catalyst which can remove nitrogen oxides at a high efficiency even at a low temperature of below 250° C., and which can be prepared by a more convenient method.

DISCLOSURE OF THE INVENTION

In light of the above problems, the present inventors have conducted intensive and through researches on the selective removal of the NOx contained in exhaust gas and, as a result, discovered that when natural manganese ores containing pyrolusite $\beta$-$MnO_2$ as a main component is used as a catalyst for selective catalytic reduction, the prepared catalyst shows excellent catalytic activity in reducing NOx at low temperatures (130–250° C.), without further subjecting the ores to difficult and costly processing.

It is therefore an object of the present invention to overcome the above problems encountered in prior arts and to provide a method for removing NOx contained in exhaust gas, by which the NOx contained in exhaust gas is reduced at relatively low temperatures at an excellent efficiency.

It is another object of the present invention to provide a method for preparing a catalyst for removing NOx contained in exhaust gases, which is relatively simple and economically favorable.

In accordance with the present invention, the above objects could be accomplished by a provision of a method for removing the nitrogen oxides in exhaust gas, characterized in that a selective catalytic reduction technique using ammonia as a reductant is carried out at a temperature of 130–250° C. in the presence of a catalyst prepared from natural manganese ores to remove the nitrogen oxides, wherein the natural manganese ores contain 50–90 wt % of pyrolusite of $\beta$-$MnO_2$ as a main component.

BRIEF DESCRIPTION OF THE DRAWINGS

The above and other objects and aspects of the invention will become apparent from the following description of embodiments with reference to the accompanying drawings in which.

BEST MODES FOR CARRYING OUT THE INVENTION

Figure 1:
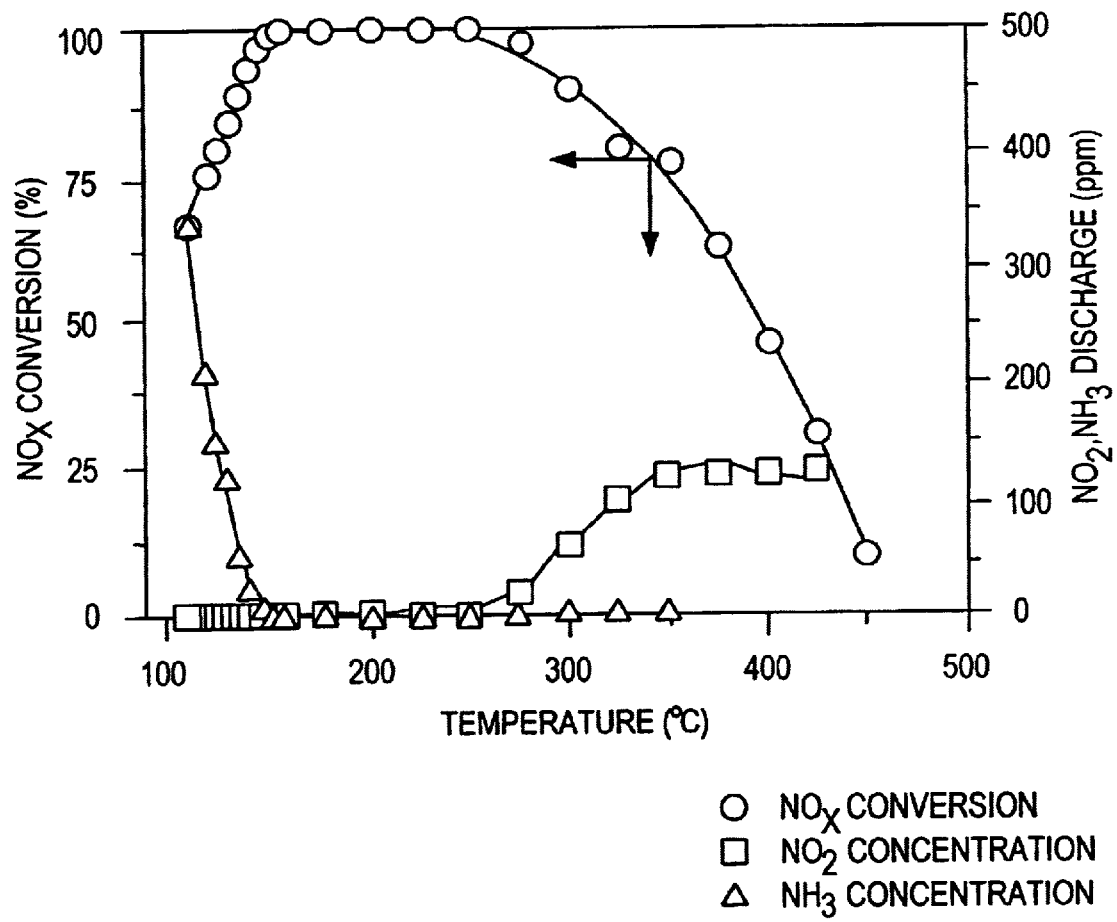
FIG. 1 shows the conversion rate of the NOx contained in exhaust gas versus temperature when the exhaust gas is treated with ammonia as a reductant in the presence of a catalyst prepared from natural manganese ores according to Example 1, and shows the discharge amounts of nitrogen dioxide and ammonia in the treated exhaust gas.

In accordance with the present invention, natural manganese ores are used as a catalyst for removing NOx in the exhaust gas. One example of natural manganese ores employable in this invention has an average chemical composition and physical properties, as listed in Tables 2 to 4, below.

TABLE 2

Average Chemical Composition of Natural Manganese Ores

| Ingred | Mn | $SiO_2$ | $Al_2O$ | Fe | CaO | MgO | *$O_2$ Balance o Nn & Fe |
|---|---|---|---|---|---|---|---|
| Wt % | 51.83 | 3.1 | 2.51 | 3.8 | 0.1 | 0.2 | 38.31 |

*in case of Mn and Fe, various oxidized forms such as $MnO_2$, $Mn_2O_3$, $Mn_3O_4$, FeO, $Fe_2O_3$, $Fe_3O_4$ exist. When $MnO_2$ and $Fe_2O_3$, which are the most naturally abundant, are considered, $MnO_2$ is regarded to be contained at about 84 wt % in the natural manganese ore.

It should be noted that the expression "natural manganese ores" as used herein, means the manganese ores which are found in mineral deposits on the earth's surface. As seen in Table 2, natural manganese ores are in the form of composite oxides, which consist mainly of the oxides of Mn, Fe, Ca, Mg, Al, Si and the like.

In general, manganese ores are classified into $\alpha$-, $\beta$-, $\gamma$- and $\epsilon$-type $MnO_2$, depending on the crystalline structure of $MnO_2$, which have different properties from one another. Among them, $\alpha$-type $MnO_2$ and $\beta$-type $MnO_2$ is the most abundant in the nature. $\alpha$-type $MnO_2$ consists mainly of $KMn_8O_{16}$ (cryptomelane) and $BaMn_8O_{16}$ (hollandite), while $\beta$-type $MnO_2$ is classified into pyrolusite. As a result of XRD measurement, the natural manganese ores exemplified as above have the diffraction space interval and the intensity ratio as shown in Table 3 below.

TABLE 3

| | Diffraction space interval (A) | | | |
|---|---|---|---|---|
| Natural manganese ore | 3.11 | 2.39 | 2.15 | 1.62 |
| Intensity ratio | 1.0 | 0.5 | 0.2 | 0.4 |

As seen from the above Table 3, the peak of the above natural manganese ores have the maximum strength at 3.11 Å and show similar XRD measuring results to those of pyrolusite of $\beta$-$MnO_2$.

Further, the density, pore volume and specific surface area of the above natural manganese ores as determined by BET, are shown in Table 4, below.

TABLE 4

Average Physical Properties of Natural Manganese Ores

| | |
|---|---|
| Density (kg/m$^3$) | About 3980 |
| Pore Vol. (cm$^3$/g) | About 0.0392 |
| Specific Surface Area (m$^2$/g) | About 11.0 |

As shown above, according to the present invention, the natural manganese ores used in a selective catalytic reduction technique at a low temperature for removing nitrogen oxides consist mainly of pyrolusite of β-MnO$_2$, the content of which is about 50–90 wt. %. In this case, the physical properties of the natural manganese ores typically have a density of about 3000–4000 kg/m$^2$, a pore volume of about 0.03–0.1 cm$^3$/g and a specific surface area of about 5–50 m$^2$/g, but they are not essentially limited to the above range and can vary according to other components except pyrolusite.

Further, as can be seen from the chemical composition of the above Table 2, the natural manganese ores contain as additional components oxides of various metals (Mn, Fe, etc.) which are known as catalysts useful in the selective catalytic reduction technique, in addition to pyrolusite. Accordingly, the synergistic effect of the components can improve the NOx-removal performance, as compared to the catalyst comprising only individual components. A mixed gas of NOx, ammonia and oxygen was introduced into a reactor (e.g. immobilized bed reactor) in which natural manganese ores were used as a catalyst, and the conversion rate of NOx depending on temperature was observed. As a result, differently from a conventional metallic oxide catalyst, the temperature at which maximum conversion is obtained is considerably low (about 150° C.). Further, over a considerably wide temperature range (about 130–250° C.), the conversion of NOx of 90% or higher is obtained. Therefore, the use of the catalyst from the natural manganese ores in accordance with the present invention brings about a significant, economic benefit because the exhaust gas needs not be heated to high temperatures in order to carry out the SCR technique. In addition, the wide range of the temperatures at which the natural manganese ores can treat NOx allows them to be applied to various process conditions.

It is preferable that the molar ratio of ammonia to NOx ranges from 0.7 to 1.2 in the presence of the catalyst of the present invention. For example, if the molar ratio is less than 0.7, the SCR efficiency is too low. On the other hand, if the molar ratio exceeds 1.2, an increased amount of catalyst is needed to prevent NH$_3$ from remaining unreacted and thus, it is economically unfavorable. In addition, it is preferable that the gaseous hourly space velocity (GHSV) of the exhaust gas supplied to the reactor is adjusted to about 2500–50000 hr$^{-1}$.

In accordance with the present invention, natural manganese ores are pulverized into particles of a homogeneous size in order to enhance their catalytic activity by virtue of increased surface area. The size is determined by the type of catalyst used. For instance, where natural manganese ores are applied to a honeycomb structure for preparing a catalytic body, they are finely powdered to an average size of 10 μm or less. If the average size of the powder is over 10 μm, it is hard to form a slurry from the powder, which thus makes it difficult to coat the powder on the honeycomb structure. Alternatively, the natural manganese ores may be crushed to granular sizes, and then filled in a reactor, preferably in the form of a mass to play the role of the catalyst. In this case, the crushed natural manganese ores are required to be completely dehydrated at, for example, 100–120° C. in order that side-reactions are prevented.

A detailed description will be given of the application procedure of natural manganese ores to a honeycomb structure, below.

First, natural manganese ores are finely powdered to an average size of 10 μm or less using a mill.

Then, the powder is added to water (preferably, distilled water), mixed together, and adjusted to pH 6.5–6.8 with an acid under stirring to give a slurry. Preferably, the amount of the powder ranges from about 20 to 50 wt % in water. For example, if the amount of the powder is below 20 wt %, a coating work is not easily performed. On the other hand, a concentration higher than 50 wt % results in a slurry which is too viscous to coat with.

Illustrative, non-limiting, examples of the acid available include sulfuric acid, hydrochloric acid, nitric acid and acetic acid, with preference to nitric acid. A pH value of less than 6.5 causes the fine particles to aggregate together and precipitate. On the other hand, if the pH exceeds 8.5, there occurs an ionic interaction among the fine particles of the slurry, which reduces the coatability of the slurry.

In the preparation of the slurry, it is preferred that a binder is added at an amount of about 1–5 weight parts based on 100 parts by weight of the slurry under the consideration of mechanical properties. The binder may be selected from the group consisting of methoxymethyl cellulose (MC), polyvinyl alcohol (PVA), carboxymethyl cellulose (CMC), polyethylene glycol (PEG), silica sol, alumina sol and the mixtures thereof. Next, a honeycomb structure, commercially available, is immersed in the slurry for 2–3 hours and dried at room temperature. A further step of drying at about 100–120° C. for 4–6 hours is very helpful in preventing side-reactions while the resulting honeycomb is used as a catalyst. Subsequently, the honeycomb structure is calcined at 350–500° C. for 4–8 hours in an electric furnace, to coat the natural manganese ore powder thereon.

A better understanding of the present invention may be obtained in light of the following examples which are set forth to illustrate, but are not to be construed to limit the present invention.

EXAMPLE 1

Natural manganese ores were tested for the catalytic activity in reducing NOx. To this end, natural manganese ores were crushed into particles ranging, in size, from 40 to 50 mesh (average particle size 0.359 mm), followed by filling the particles to a volume of about 3 ml in an immobilized bed reactor with an inner diameter of 8 mm. NOx was provided at a concentration of 690 ppm with the provision of ammonia at an amount 1.12 times in mole as much as that of the Nox and an O$_2$ concentration of 3 volume %. The catalyst layer allowed gas to pass therethrough at a gaseous hourly space velocity (GHSV) of 20,000 hr$^{-1}$.

Referring to FIG. 1, it can be seen that the catalyst crushed from the natural manganese ores has a conversion rate of nearly 100% above 150° C. This testifies that manganese oxides serve as a catalyst superior in reducing NOx. Also, the data show that the temperature range in which the conversion rate of the manganese ores is kept at 100%, is from 150 to 250° C.; thus the temperature range capable of obtaining the excellent conversion is wide. In addition, in this temperature range, the excess ammonia was found to be completely oxidized without remaining unreacted. This is believed to result from the low-temperature reduction of manganese oxides and the influence from other metal oxides contained in the ores or the synergistic effect therebetween. Particularly, when the reaction temperature exceeds 250° C., the ammonia gas does not participate in the selective catalytic reduction; rather, the amount oxidized increases. Thus, the conversion rate of nitrogen oxides reduces sharply as the temperature increases. Further, in the manganese oxides the value of oxidization varies as the temperature increases as shown in the reaction formula VII below. In case of $MnO_2$, the oxidization state is changed to $Mn_2O_3$ at temperatures of more than 600° C. Correspondingly, the reducing performance of selective catalyst is changed. Accordingly, the selective catalytic reduction technique using a catalyst of $MnO_2$ or a catalyst including $MnO_2$ must be conducted at a temperature of less than 600° C., and the catalyst applied at the temperature of more than 600° C. cannot take the form of $MnO_2$.

$$MnO_2 \xrightarrow{600°\,C.} Mn_2O_3 \xrightarrow{900°\,C.} Mn_3O_4 \xrightarrow{1700°\,C.} MnO \quad \text{(VII)}$$

Therefore, where natural manganese ores are used as a catalyst for SCR, at least 90% of NOx can be completely removed at a low temperature of 130–250° C., preferably 150–220° C. The catalyst from the natural manganese ores can be preferably used as a low-temperature catalyst in accordance with the present invention.

EXAMPLE 2

The NOx-removal reaction was carried out by selective catalytic reduction technique in the presence of the natural manganese ore catalyst of Example 1 and pure manganese oxides ($MnO_2$ and $Mn_2O_3$), respectively. Here, the concentration of the used nitrogen oxides was 400 ppm, the concentration of ammonia was 10 times in mole that of the nitrogen oxides, the oxygen concentration was 15 volume %, the gaseous hourly space velocity (GHSV) in the catalyst layer was 30,000 hr$^{-1}$, and the reaction temperature was 150° C.

Figure 2:
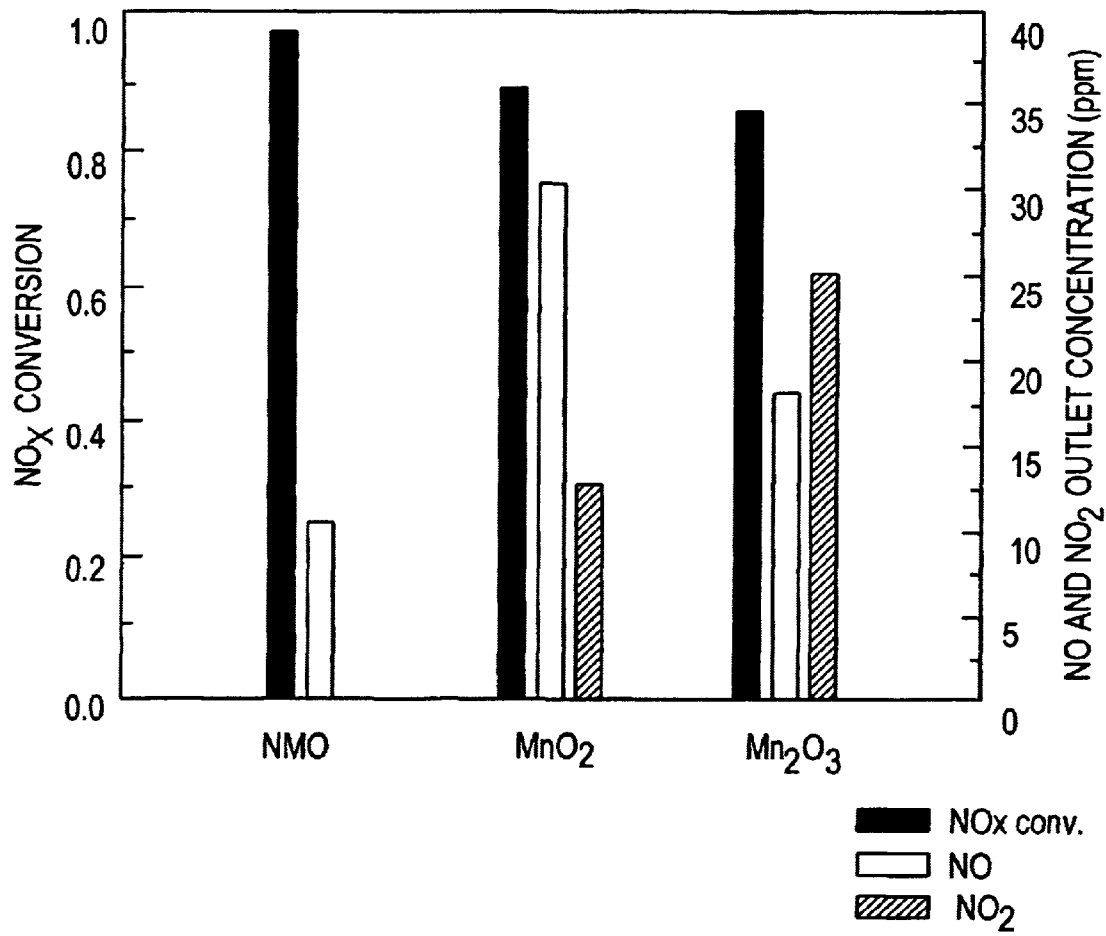
FIG. 2 shows the Nox-removal rate, the discharge amount of nitrogen monoxide and the discharge amount of nitrogen dioxide of natural manganese ore catalyst, $MnO_2$ catalyst, and $MnO_3$ catalyst, respectively as measured in accordance with Example 2.

Referring to FIG. 2, none of the three catalysts discharged ammonia, but it was shown that the conversion rate of nitrogen oxides of the natural manganese ore catalyst is most excellent, and that the amount of the unreacted and discharged NO is lowest. Further, differently from the pure manganese oxides, no nitrogen dioxide was produced. According to FIG. 2, it was confirmed that in case of pure $MnO_2$ and $Mn_2O_3$ the activity differs depending on the oxidization state of manganese. That the natural manganese ore catalyst used in the present invention shows excellent NOx-removal performance is understood to stem from the synergistic effect between β-$MnO_2$ (pyrolusite) as a main component and other metallic oxides in the natural manganese ores. Moreover, considering that selective catalytic reduction properties with respect to nitrogen oxides differ from the catalyst using pure $MnO_2$ or pyrolusite, the differences between the natural manganese ores and pure $MnO_2$ or pyrolusite and $Mn_2O_3$ could be confirmed.

In view of foregoing, it can be seen that the manganese oxides on the zeolite support as disclosed in U.S. Pat. No. 5,589,147 is a catalyst component different from the natural manganese ores used in the present invention. Particularly, NO conversion rate according to Examples of the above patent was 25% (catalyst A), 65% (catalyst B) and 40% (catalyst C), respectively at 250° C., and 71%(catalyst A), 92% (catalyst B) and 84% (catalyst C), respectively at 550° C. The higher temperature, the conversion rate is increased. However, it was confirmed that the natural manganese ore catalyst used in the present invention shows the removal rate of nitrogen oxides near 100% at the temperature ranging from 130 to 250° C.; and that the conversion rate is, rather, reduced at temperatures exceeding the above range. Accordingly, the catalyst of the present invention has a different temperature range exhibiting the maximum conversion rate from the above patent. That is, the catalyst of the above patent shows a high conversion rate at high temperature of above 550° C., whereas the catalyst of the present invention shows a high conversion rate within the low temperature range of below 250° C. Thus, it can be seen that the two catalysts are essentially different.

EXAMPLE 3

The NOx-removal reaction was carried out by a selective catalytic reduction technique using pure $MnO_2$, $Mn_xO_y[2]$/γ-$Al_2O_3$ (Mn oxides 2 wt %, wherein wherein $1.5 \leq x \leq 2$, $2 \leq y \leq 3$) and the natural manganese ore catalyst of Example 1, respectively, under the same condition as Example 2. The conversion rate of nitrogen oxides depending on time was measured. The results are shown in FIG. 3.

Figure 3:
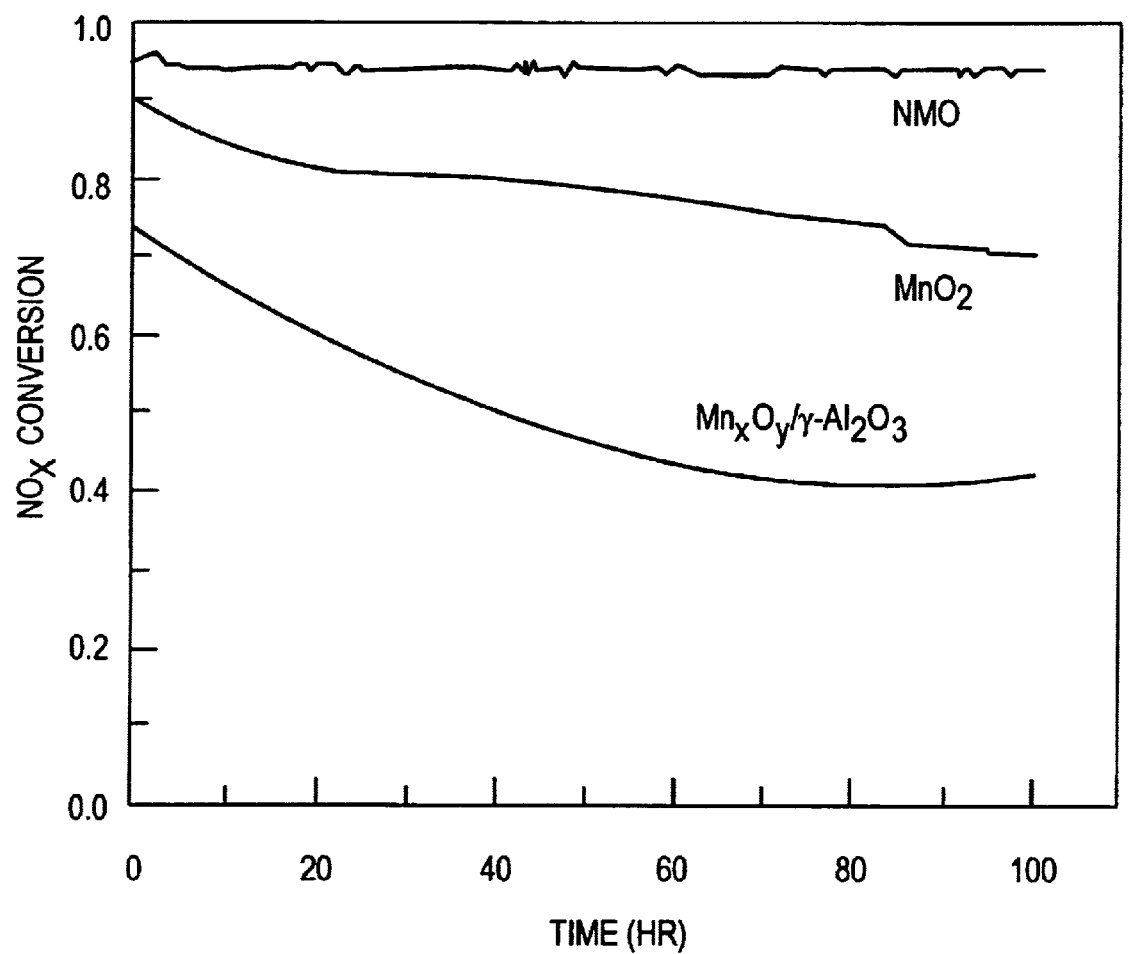
FIG. 3 shows the conversion rate of nitrogen oxides versus time of natural manganese ore catalyst, $MnO_2$ catalyst and $Mn_xO_y[2]/\gamma$-$Al_2O_3$($Mn_xO_y$:2 wt %, wherein $1.5 \leq x \leq 2$, $2 \leq y \leq 3$) catalyst, respectively as measured in accordance with Example 3.

Referring to FIG. 3, in case of $Mn_xO_y[2]$/γ-$Al_2O_3$, the conversion rate of nitrogen oxides was 75% at the initial stage and greatly reduced to 40% after 50 hours. The reason for the above results is that nitrates are formed on the surface of the catalyst upon starting the reaction. In case of pure $MnO_2$ catalyst, the absolute amount of manganese oxides is larger than $Mn_xO_y[2]$/γ-$Al_2O_3$, and thus the degree of reducing the conversion rate of nitrogen oxides is relatively low. However, the conversion rate is reduced with the lapse of time. On the contrary, when using the natural manganese ore catalyst, no change in the conversion rate of nitrogen oxides occurred for 100 hours. Considering the above results, it can be seen that the natural manganese ore catalyst used in the present invention exhibits a catalytic property completely different from pure manganese oxides or manganese oxides-supported catalyst, and the result is also excellent.

EXAMPLE 4

Using a honeycomb structure which was coated with finely powdered natural manganese ores, an SCR technique was carried out to remove NOx.

For coating the honeycomb structure with the powder, first, natural manganese ores were pulverized into a fine powder with an average particle size of 10 μm or less. The powder was added to 1000 g of distilled water to give a 30 wt % slurry. The slurry was adjusted to about pH 7 with nitric acid under stirring, followed by adding 30 g of methoxy methyl cellulose (MC) thereto. A honeycomb structure, preferably made from cordierite, was immersed in the slurry for about 3 hours, dried at room temperature and then, at about 103° C. for about 5 hours, and calcined at 400° C. for 6 hours in an electric furnace.

Before carrying out the SCR technique, the prepared honeycomb structure was inserted in a conical type honeycomb reactor with a size of 5 cm. In this experiment, oxygen was provided at a concentration of 3 volume %, NOx at a concentration of 420 ppm, and ammonia at a concentration 1.10 times in mole as much as that of NOx. The ratio of diameter to height of the honeycomb structure was 0.75. The results are given as shown in FIG. 4.

Figure 4:
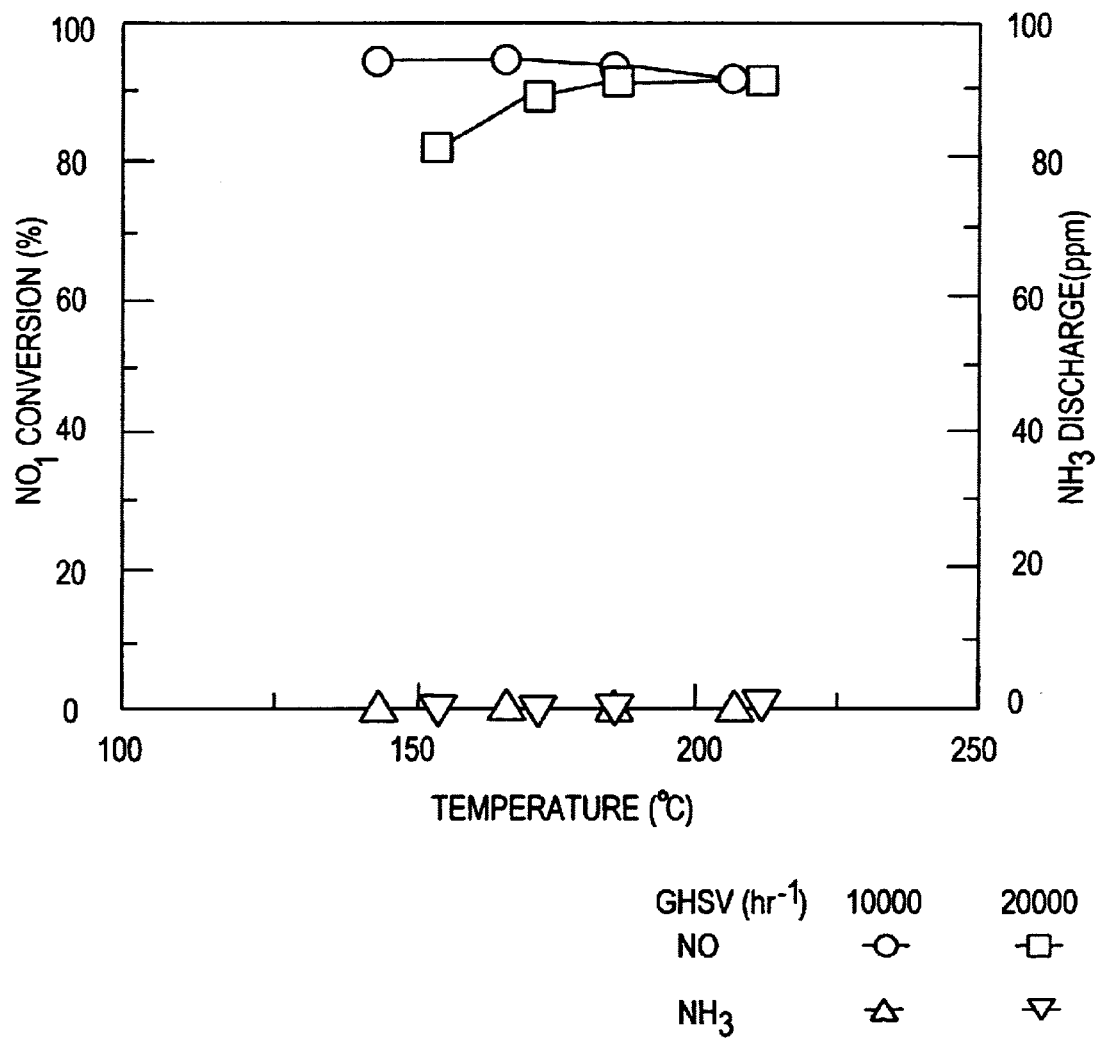
FIG. 4 is a graph showing the conversion rate of the NOx versus temperature and the amounts of ammonia discharged from the treated exhaust gas as measured when using a catalyst prepared in accordance with Example 4.

As apparent from the data of FIG. 4, the honeycomb structure-supported catalyst removes NOx at high efficiency at low temperatures and does not allow ammonia to be discharged.

EXAMPLE 5

The procedure of Example 4 was repeated, except that the concentration of the natural manganese powder in water is 30 wt %, 40 wt % and 47 wt %, respectively and that the honeycomb structure used was 13 mm high with a ratio of diameter to height being 0.25. The results are given as shown in FIG. 5.

Figure 5:
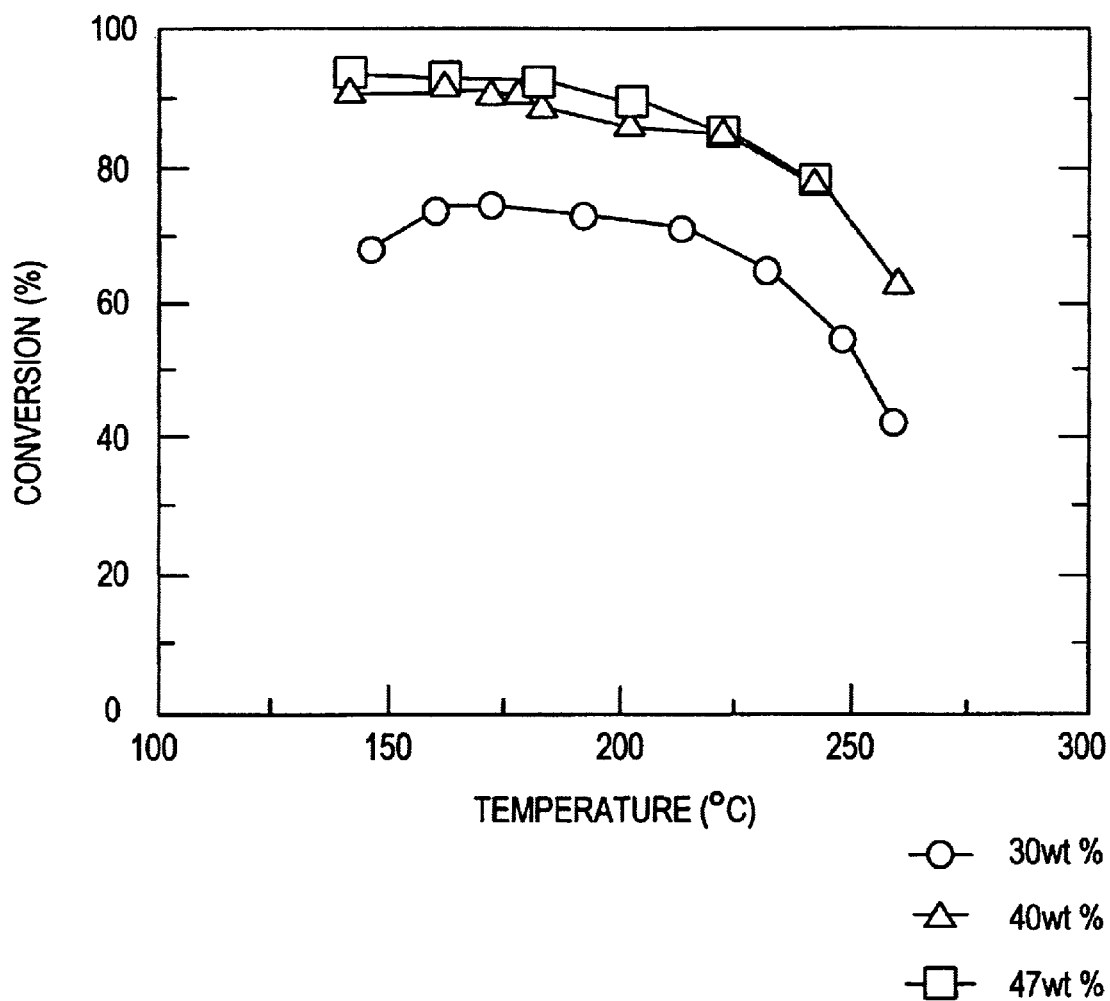
FIG. 5 is a graph showing the conversion rate of nitrogen oxides versus temperature as measured varying the concentration of natural manganese ores in the slurry for applying to a honeycomb structure in accordance with Example 5.

As shown in FIG. 5, the concentration of the natural manganese ore components must be above a certain level in the slurry in order to maintain the catalytic activity of the honeycomb-supported catalyst high. This means that the more the natural manganese ores is coated on the honeycomb structure, the higher the NOx-removal efficiency is. In fact, the conversion rate was measured to increase 2–3% every coating round to a certain number of coatings (about 5 rounds).

EXAMPLE 6

The conversion rate of nitrogen oxides was measured by using the catalyst prepared in Example 4 with changing the molar ratio of $NH_3/NO_x$ to 0.7–1.2 per each temperature over the temperature range of 110–220° C. The gaseous hourly space velocity (GHSV) of the gas supplied in the reactor was 30,000 $hr^{-1}$, and the $O_2$ concentration was 15 volume %. Further, the gas contains mainly NO based on 400 ppm of the total nitrogen oxides (NO: 390 ppm, $NO_2$:10 ppm). The results are given as shown in FIG. 6.

Figure 6:
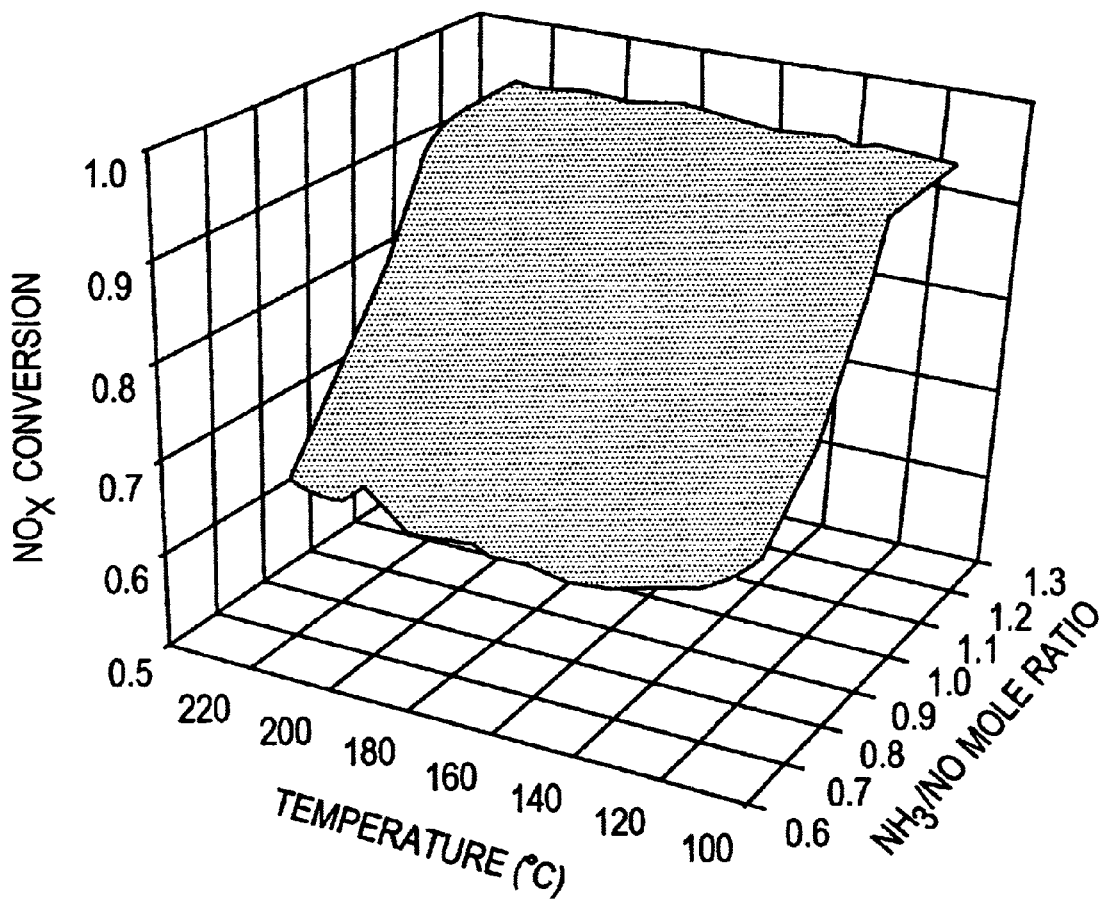
FIG. 6 is a graph showing the convention rate of $NO_x$, as measured by changing the molar ratio of $NH_3/NO_x$ at various temperatures using the catalyst of Example 4, in accordance with Example 6.

Referring to FIG. 6, it can be seen that the conversion rate of the nitrogen oxides at respective temperature $NH_3/NO_x$, is almost linearly proportional to the molar ratio of $NH_3/NO_x$. In accordance with stoichiometry, the theoretical molar ratio of $NH_3/NO_x$ for obtaining maximum conversion rate of the nitrogen oxides theoretically is 1.005, which approximates 1.0. The maximum conversion rate appeared at a molar ratio of 1.0–1.1 experimentally

INDUSTRIAL APPLICABILITY

According to the present invention, when a selective catalytic reaction is carried out using natural manganese ores as a catalyst and ammonia as a reductant, the nitrogen oxide can be completely removed at a low temperature of 130–250° C., the preparation of catalyst is easy and the cost of preparation is low.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for removing nitrogen oxides in an exhaust gas, which comprises carrying out a selective catalytic reduction by use of ammonia as a reductant in the presence of a catalyst comprising natural manganese ores at a temperature of 130–250° C. to remove the nitrogen oxides, wherein the natural manganese ores contain 50–90 wt % of pyrolusite of beta-$MnO_2$ as a main component.

2. The method as set forth in claim 1, wherein said catalyst is used in the form of a mass of crushed particles of the natural manganese ores.

3. The method as set forth in claim 1, wherein said catalyst is used in the form of a catalytic body which is prepared by coating powders of the natural manganese ores with an average size of 10 $\mu$m or less on a honeycomb structure.

4. A method as set forth in claim 3, wherein said catalyst is prepared by a process comprising the steps of adding the powders of the natural manganese ores at an amount of 20–50 wt % in water and adjusting pH thereof in the range of 6.5–8.5 with an acid to prepare a slurry, in which a binder is added at an amount of 1–5 parts by weight of on the basis of 100 parts by weight of the slurry; and immersing a honeycomb structure in the slurry, followed by drying and calcining the resulting structure.

5. A method as set forth in claim 1, wherein said ammonia is fed at a molar ratio of 0.7–1.2 to said nitrogen oxides of the exhaust gas.

6. A method as set forth in claim 1, wherein said exhaust gas is fed at a gaseous hourly space velocity of 2500–50000 $hr^{-1}$.

* * * * *

UNITED STATES PATENT AND TRADEMARK OFFICE
CERTIFICATE OF CORRECTION

PATENT NO. : 6,641,790 B2
DATED : November 4, 2003
INVENTOR(S) : Hong et al.

It is certified that error appears in the above-identified patent and that said Letters Patent is hereby corrected as shown below:

<u>Title page,</u>
Item [73], Assignee, delete "Seoul", insert -- Gyeonggi-do --.

Signed and Sealed this

Thirtieth Day of November, 2004

JON W. DUDAS
*Director of the United States Patent and Trademark Office*